United States Patent
Yoshimura et al.

[11] Patent Number: 5,977,485
[45] Date of Patent: Nov. 2, 1999

[54] BATTERY CONNECTOR COVER

[75] Inventors: Masanobu Yoshimura; Suminori Ishikawa, both of Yokkaichi, Japan

[73] Assignee: Sumitomo Wiring Systems, Ltd., Japan

[21] Appl. No.: 08/929,301

[22] Filed: Sep. 11, 1997

[30] Foreign Application Priority Data

Sep. 25, 1996 [JP] Japan ................................. 8-252925
Sep. 25, 1996 [JP] Japan ................................. 8-252926

[51] Int. Cl.⁶ .............................. H01B 7/00; H01R 13/52
[52] U.S. Cl. ................ 174/138 F; 174/139; 174/138 R; 174/135; D13/120; D13/156; 439/521; 439/447
[58] Field of Search .................... 174/139, 138 F, 174/135; 429/65, 121, 522, 521, 523; D13/156, 120

[56] References Cited

U.S. PATENT DOCUMENTS

| | | | |
|---|---|---|---|
| 3,019,287 | 1/1962 | Newcomb et al. | 174/138 |
| 3,884,725 | 5/1975 | Schmidt | 136/134 R |
| 3,956,576 | 5/1976 | Jensen et al. | 174/138 F |
| 4,562,125 | 12/1985 | Davis | 429/65 |
| 4,921,443 | 5/1990 | Sato | 439/521 |
| 4,952,171 | 8/1990 | Sugiyama | 439/522 |
| 5,169,338 | 12/1992 | Dewar et al. | 439/522 |
| 5,340,339 | 8/1994 | Desai et al. | 439/892 |
| 5,576,516 | 11/1996 | Kameyama et al. | 174/138 F |

FOREIGN PATENT DOCUMENTS

| | | |
|---|---|---|
| 1 166 690 | 11/1958 | France . |
| 7-130353 | 5/1995 | Japan . |
| 7-335195 | 12/1995 | Japan . |
| 8-111217 | 4/1996 | Japan . |
| 573123 | 11/1945 | United Kingdom . |
| 2 014 781 | 8/1979 | United Kingdom . |

*Primary Examiner*—Kristine Kincaid
*Assistant Examiner*—Mark Olds
*Attorney, Agent, or Firm*—Anthony J. Casella; Gerald E. Hespos

[57] ABSTRACT

A cover of a simple construction is provided which can deal with a distance variation between battery posts. The cover 6 is made of a rubber material and has a narrow box-like configuration. A bottomed middle portion of the cover 6 forms a tubular portion 107 through which a braided wire 3 of a battery connection terminal 1 is to be passed, and the opposite ends thereof form post cover portions 108 for covering battery posts 2. Further, slits 9 are formed in side walls between the tubular portion 107 and the post cover portions 108, so that the post cover portions 108 can be bent upward. In this way, since the cover 6 can be elongated and contracted according to a distance between the battery posts 2, it can be easily mounted and the action of an undesired force on the cover 6 due to the vibration of batteries 5 can be effectively prevented.

10 Claims, 9 Drawing Sheets

BATTERY CONNECTOR COVER

BACKGROUND OF THE INVENTION

1. Field of the Invention

The present invention relates to a cover for at least partially covering a connection terminal for connecting battery posts.

2. Description of the Prior Art

With the development of electric automotive vehicles, a plurality of batteries are connected to construct a drive source of large capacity. A battery connection terminal is used to connect the batteries. The battery connection terminal is constructed such that terminal portions, fittable to the respective battery posts, are provided at the opposite ends of a braided wire.

A cover made of a resin is mounted on this battery connection terminal. The prior art cover has a narrow box-like configuration having an open lower surface, and the opposite ends thereof are fittable to the spaced-apart battery posts.

Since the prior art resin cover has a fixed length, it cannot be mounted if a distance between the battery posts varies even due to a slight displacement of the batteries. Further, if the batteries vibrate while the cover is mounted, the cover may be forcibly pulled according to the vibration, with the result that the cover may be subject to an undesirable stress.

To overcome the above problem, the prior art cover may be provided with a mechanism for elongating and contracting it according to a distance variation between the battery posts. However, such a mechanism makes the cover larger and is not economically preferable.

The present invention was developed in view of the above problems, and an object thereof is to provide a cover for a battery connection terminal which has a simple construction and is preferably capable of dealing with a distance variation between battery posts.

SUMMARY OF THE INVENTION

According to the invention, there is provided a cover for at least partially covering a battery connection terminal. The battery connection terminal comprises a conductive portion and one or more terminal portions which are provided on the conductive portion and are, respectively, connected with one or more battery posts. The cover comprises a cover main body for substantially covering at least partially the conductive portion, and at least one post cover portion integrally and/or unitarily formed with the cover main body for substantially covering at least partially the terminal portion and/or the conductive portion. The cover main body and the post cover portions are integrally or unitarily made of a soft or resilient insulating material.

The inventive cover has a simple construction and is applicable for covering at least partially a battery connection terminal arranged between two battery posts and/or for covering a battery connection terminal provided only on one single battery post, as e.g. a battery connection clamp for the connection with a load.

According to a preferred embodiment of the invention, there is provided a cover for covering a battery connection terminal. The battery connection terminal comprises a conductive portion and terminal portions which are provided at the opposite ends of the conductive portion and are, respectively, connected with a plurality of battery posts. The cover comprises a cover main body for covering the conductive portion, and a post cover portion integrally or unitarily formed with each end of the cover main body for covering the terminal portion together with the battery post. The cover main body and the post cover portions are integrally made of a soft insulating material.

Accordingly, since the cover main body and the post cover portions are integrally or unitarily made of a soft insulating material, the cover can be elongated and contracted according to a distance between the battery posts. As a result, the cover can be easily mounted regardless of a distance variation between the battery posts. If the batteries vibrate while the cover is mounted, the cover is elongated or contracted according to the vibration. This prevents an undesired force from acting on the cover. Further, since no special mechanism is provided to elongate and contact the cover, the cover is made neither larger nor more expensive.

Preferably, at least a portion of the cover main body forms a tubular portion through which the conductive portion can be passed.

Accordingly, the battery connection terminal connects the battery posts with the conductive portion passed through the tubular portion. This prevents the cover from being detached from the battery connection terminal, with the result that the cover and the battery connection terminal can be handled as a unit.

Further preferably, side walls are provided at the substantially opposite edges extending from the cover main body to the post cover portion, and lower edge portions of the both side walls are preferably cut substantially between the cover main body and the post cover portions to form slits. The slits formed in the side walls extending from the cover main body to the post cover portions enable the post cover portions to be made rotatable with respect to the cover main body. In other words, the terminal portions can be exposed with the cover mounted on the battery connection terminal. Accordingly, the terminal portions easily can be secured to and detached from the battery posts while the cover is mounted on the battery connection terminal, thereby realizing an efficient operation. Further, since the post cover portions can be made rotatable only by providing the slits in the cover, the construction of the cover becomes neither complicated nor larger.

The slit may be widened or rounded at its closed end. Thus there is avoided the occurrence of stress from concentrating on one location when the post cover portion(s) is/are opened, thus widening the slit.

The cover main body and the at least one post cover portion may be movably or pivotably or articulatedly connected with each other by one or more hinge portions. Thus there is provided a simple structure, which may be produced preferably with a single mold by providing the cover main body and the one or more post cover portions integrally or unitarily connected by the hinge portions.

Most preferably, the at least one post cover portion substantially covers at least partially the terminal portion and/or the conductive portion together with the battery post. Thus the battery post cannot be reached from outside when the post cover portion is arranged in its closed position.

According to a further preferred embodiment, there is provided a cover further comprising at least one press hole into which the battery post and/or a part secured thereto can be at least partially pressed or fitted or inserted or press fitted, and a peripheral portion of the press hole preferably is formed to have a substantially large thickness or enlarged thickness with respect to the thickness of the cover and/or the post cover portion.

Thus there is provided a cover for a battery post which is made of a soft insulating material such as a rubber material and is unlikely to be detached despite its simple construction.

According to a further aspect of the invention, there is provided a cover for at least one battery post, wherein the cover is made of a soft insulating material, a press hole into which the battery post and a part secured thereto can be pressed is formed in the cover, and a peripheral portion of the press hole is formed to have a large thickness.

Accordingly, when the cover is fitted on the battery post, the battery post is pressed into the press hole, making it difficult for the cover to be detached. Accordingly, the detachment of the cover due to an inadvertent external force can be prevented. Further, since the peripheral portion of the press hole is thick, the deformation of the press hole during the insertion of the battery post thereinto can be prevented, with the result that the battery post can be smoothly pressed into the press hole.

Preferably, an insertion portion of the press hole for the battery post is formed with a tapered surface for relatively guiding the battery post and the press hole. Accordingly, since the tapered surface is formed on the insertion opening of the press hole, the battery post can be smoothly inserted into the press hole, and the cover can be more easily mounted.

Further preferably, the press hole having the thick peripheral portion is provided in preferably each post cover portion.

Still further preferably, there is provided a cover for at least partially covering a battery connection terminal, which is provided with a terminal portion connectable with a battery post at each end thereof and adapted to connect battery posts, together with the battery posts, wherein a post cover portion for covering the terminal portion and the battery post is provided at each end of the cover and wherein the press hole having the thick peripheral portion is provided in each post cover portion.

Accordingly, since the cover is provided with the post cover portions at their respective ends, the juxtaposed battery posts can be covered at one time. Further, since the respective post cover portions are formed with the press holes having the thick peripheral portion, the mounting of the cover can be facilitated while making the detachment of the cover difficult.

Most preferably, the press hole is provided with a collar having an increased stiffness or rigidity preferably with respect the peripheral portion, which is arrangeable over the battery post, the collar being preferably a resin collar. The provision of the collar makes it difficult for the cover to be detached from the one or more battery posts.

These and other objects, features and advantages of the present invention will become more apparent upon a reading of the following detailed description and accompanying drawings.

DETAILED DESCRIPTION OF THE PREFERRED EMBODIMENTS

Hereafter, a first embodiment of a cover for a battery connection terminal according to the invention is described with reference to FIGS. 1 to 3.

Figure 1:
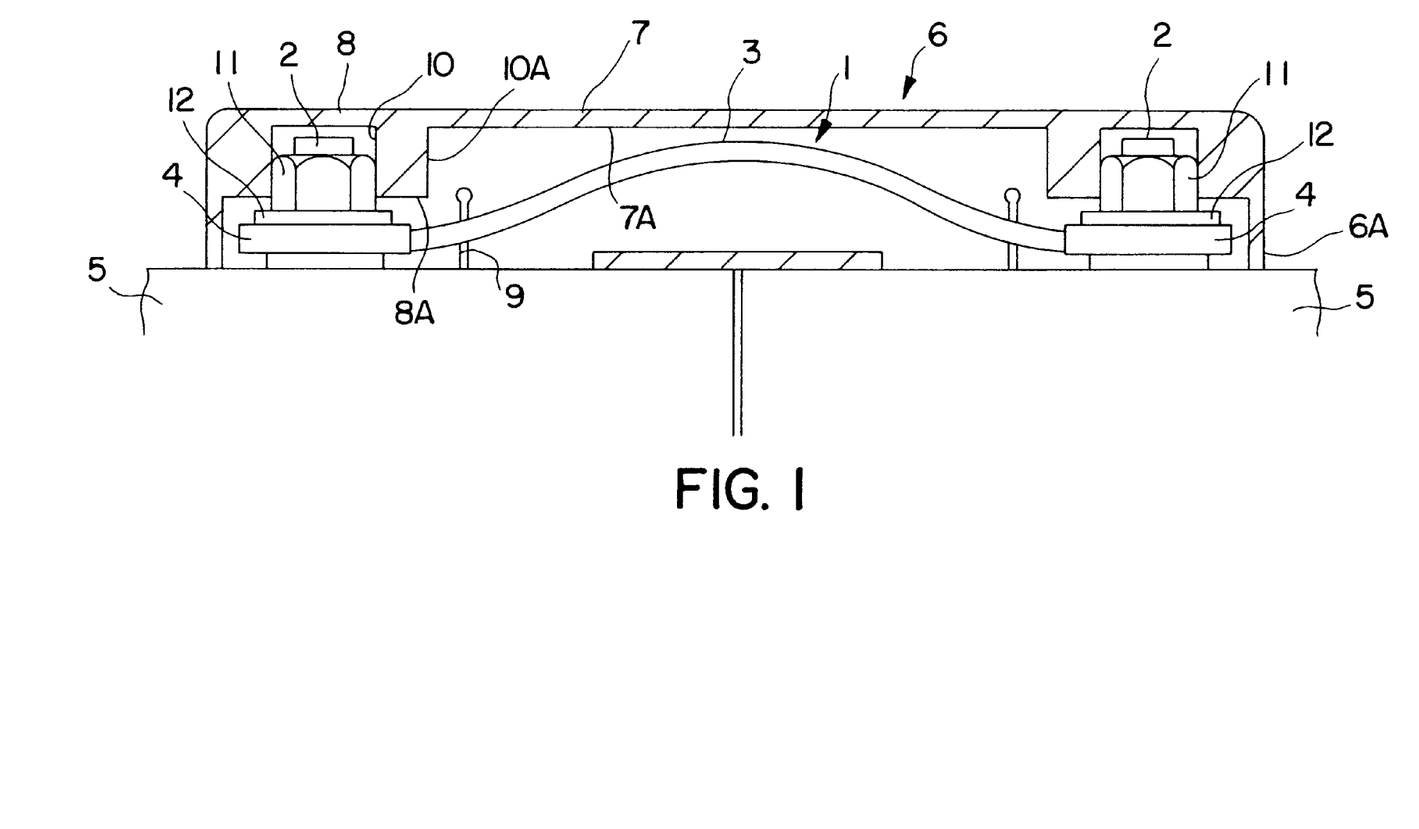
FIG. 1 is a section entirely showing a first embodiment.

In FIG. 1, identified by 1 is a battery connection terminal for connecting battery posts 2. A cover 6 is mounted to cover the connection terminal 1.

The battery connection terminal 1, as shown in FIG. 1, is comprised of a braided wire 3 (corresponding to an example of a conductive portion of the invention) formed by braiding a multitude of fine wires into a strip-like shape, and terminal portions 4 which are fixedly connected with the opposite ends of the braided wire 3 and formed with an insertion hole (not shown) through or into which the battery post 2 is insertable. The length of the braided wire 3 is so set as to slightly slacken with the respective terminal portions 4 fitted to the battery posts 2 of positioned batteries 5. This is to prevent the braided wire 3 from being strongly pulled when a distance between the battery posts 2 varies due to the displacement and/or vibration of the batteries 5.

Figure 2:
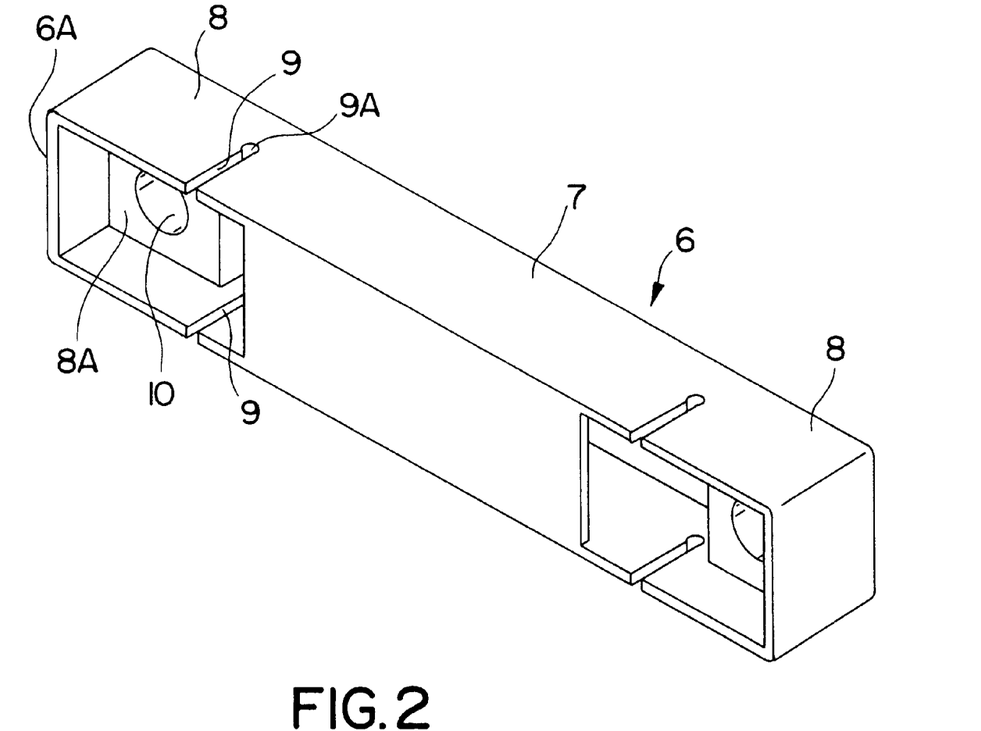
FIG. 2 is a perspective view of a cover according to the first embodiment.
Figure 3:
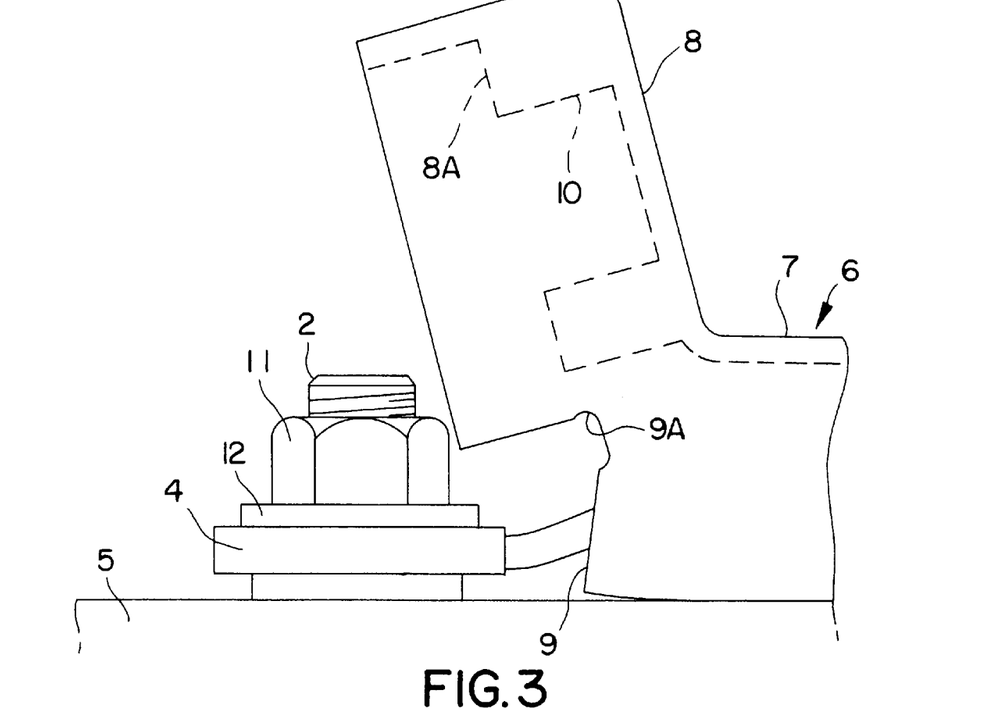
FIG. 3 is a side view showing a post cover portion, according to the first embodiment.

The cover 6 is made e.g. of a rubber or elastic or elastomeric or deformable or elongatable or plastic material and has preferably a narrow box-like configuration as shown in FIG. 2. This rubber or elastic material corresponds to an example of a soft insulating material of the invention. A bottomed middle portion of the cover 6 forms a tubular portion 7 (corresponding to a cover main body of the invention). Post cover portions 8 each having an open lower surface (front surface in FIG. 2) are continuously formed with the opposite ends (opposite ends with respect to a longitudinal direction) of the tubular portion 7. A pair of slits 9 are formed preferably in each of front and rear side walls (upper and lower walls in FIG. 2) between the post cover portions 8 and the tubular portion 7. The slits 9 extend upward from the bottom edge of the side walls (to the back from the front edges in FIG. 2). Accordingly, the respective post cover portions 8 can be bent or deformed in an opening direction, e.g. away from the battery post 2, when arranged on a battery 5, in particular substantially upwardly while the width of the respective slits 9 are widened (see FIG. 3). An upper end 9A of each slit 9 is substantially rounded so as to substantially prevent stresses from concentrating on one location when the post cover portion 8 is bent toward its opening position, e.g. upward, thereby preventing the cover 6 from being cracked.

As shown in FIG. 1, a ceiling or bottomed portion 8A of each post cover portion 8 is preferably formed substantially thicker than a ceiling portion 7A of the tubular portion 7 (e.g. the portion of the tubular portion 7 arranged substantially on the same side as the ceiling portion 8A). In other words, the ceiling wall of the cover 6 is made thicker at the opposite side portions (left and right side portions in FIG. 1). The thick ceiling portion 8A of each post cover portion 8 is formed with a press hole 10 into which the battery post 2 is pressed or pressable. The inner diameter of the press hole 10 is set preferably slightly smaller than the outer diameter of a holding means, e.g. a nut 11 to be arranged on or screwed to the battery post 2 for holding or securing the battery connection terminal 1 on the battery post 2, and the depth thereof is preferably set such that the bottom edge of the cover 6 is substantially in contact with the upper surface of the battery 5 when the leading end of the battery post 2 is almost in contact with the ceiling surface of the press hole 10. The battery post 2 and the nut 11 screwed thereto are pressed into the press hole 10. The size of the press hole 10 is sufficiently smaller than the area of the ceiling portion 8A and, accordingly, a peripheral portion 10A of the press hole 10 is thicker than a side wall 6A of the cover 6.

Next, an operation of connecting the juxtaposed batteries 5 is described. First, the cover 6 is mounted on the battery connection terminal 1. Specifically, the battery connection terminal 1 is inserted into the tubular portion 7 though an opening in one post cover portion 8 and pulled out through an opening in the other post cover portion 8. As a result, the battery connection terminal 1 is passed through the tubular portion 7 with the respective terminal portions 4 arranged in or at the post cover portions 8, thereby completing the mounting of the cover 6.

Subsequently, one post cover portion 8 is bent in an opening direction, e.g. upwardly, and the exposed terminal portion is fitted to the corresponding battery post 2. Then, a washer 12 is fitted to the battery post 2 and the nut 11 is screwed above the washer 12 (see FIG. 3). Thereafter, if the upwardly bent post cover 8 is substantially restored to its original position, the battery post 2 is inserted or fitted, preferably pressed (or press fitted) into the press hole 10 together with the nut 11.

The other post cover portion 8 is similarly bent upward and the exposed terminal portion 4 is fitted to the corresponding battery post 2, which is then fastened by the nut 11 together with the washer 12. If the upwardly bent post cover 8 is substantially restored to its original position, the battery post 2 is pressed into the press hole 10 together with the nut 11. At this time, if the batteries 5 are displaced to make the distance between the battery posts 2 longer than a specified distance, the battery post 2 is pressed into the press hole 10 together with the nut 11 while elongating the cover 6. If the distance between the battery posts 2 is shorter than the specified distance, the battery post 2 is pressed into the press hole 10 together with the nut 11 while contracting the cover 6. In this way, the connection of the juxtaposed batteries 5 is completed (see FIG. 1).

As described above, since the cover 6 is made of an elastic or deformable or elongatable or plastic or rubber material in this embodiment, the cover 6 can be elongated and contracted according to a distance variation between the battery posts 2 and, accordingly, the cover 6 can be easily mounted. Further, if the batteries 5 vibrate while the cover 6 is mounted, the cover 6 is elongated or contracted according to the vibration, thereby preventing an undesirable force from acting on the cover 6. Furthermore, since no special mechanism is provided to elongate and contract the cover 6, the cover 6 is made neither larger nor more expensive.

Further, since the cover 6 is preferably provided with the tubular portion 7 through which the battery connection terminal 1 is to be or can be passed, it can be mounted with the battery connection terminal 1 passed through the tubular portion 7. This prevents the cover 6 from being detached from the battery connection terminal 1, with the result that the cover 6 and the battery connection terminal 1 can be handled as a unit.

Furthermore, since the post cover portions 8 are made preferably bendable in positions where the terminal portions 4 are exposed, the terminal portions 4 can be secured to and detached from the battery posts 2 with the cover 6 mounted on the battery connection terminal 1, realizing a more efficient connection operation. Further, since the post cover portions 8 can be made bendable only by providing the slits 9, the construction of the cover 6 is neither complicated nor larger.

Figure 4:
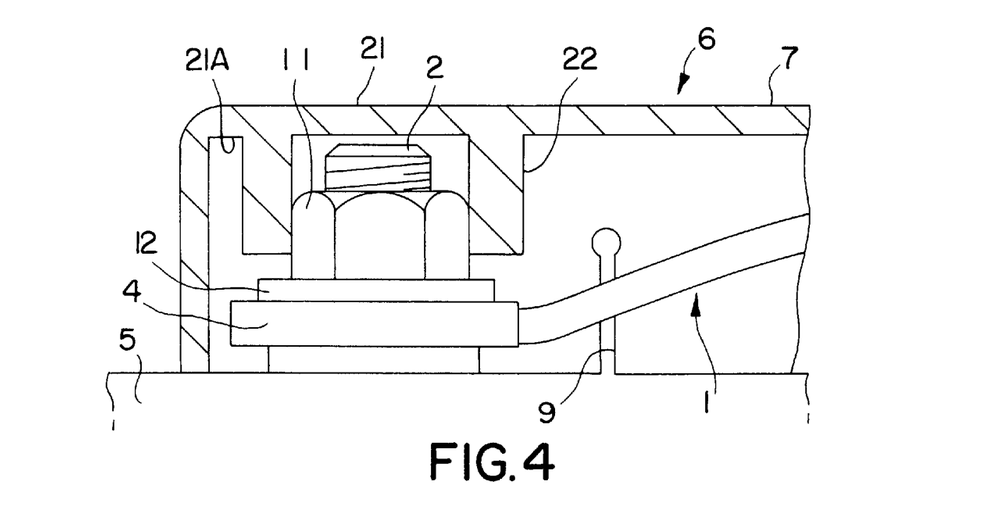
FIG. 4 is a section showing a post cover portion according to a second embodiment.

Although the press holes 10 are formed in the thick ceiling portions 8A of the post cover portions 8 in the first embodiment (see FIG. 1), a downward projecting hollow cylindrical portion 22 may be provided on a ceiling portion 21A of a post cover portion 21, as shown in FIG. 4, without thickening the ceiling portion 21A. Since the other parts of a second embodiment are similar to those of the first embodiment, no description is given thereon by identifying them by the same reference numerals.

In this embodiment, the battery posts 2 are inserted, preferably pressed into the cylindrical portions 22 together with the nuts 11. Further, similar to the first embodiment, since the cover 6 is made of a rubber or elastic material, it can be elongated and contracted according to a distance between the battery posts 2. Accordingly, the cover 6 can be mounted regardless of a distance variation between the battery posts 2 and the action of an undesirable force on the cover 6 due to the vibration of the batteries can be effectively prevented.

As explained above, with respect to the first embodiment, the battery connection terminal 1 is constructed such that the terminal portions 4 are fixedly connected with the opposite ends of the braided wire 3 (see FIG. 1) and the cover 6 has preferably a narrow box-like configuration substantially in conformity with the configuration of the battery connection terminal 1.

Figure 5:
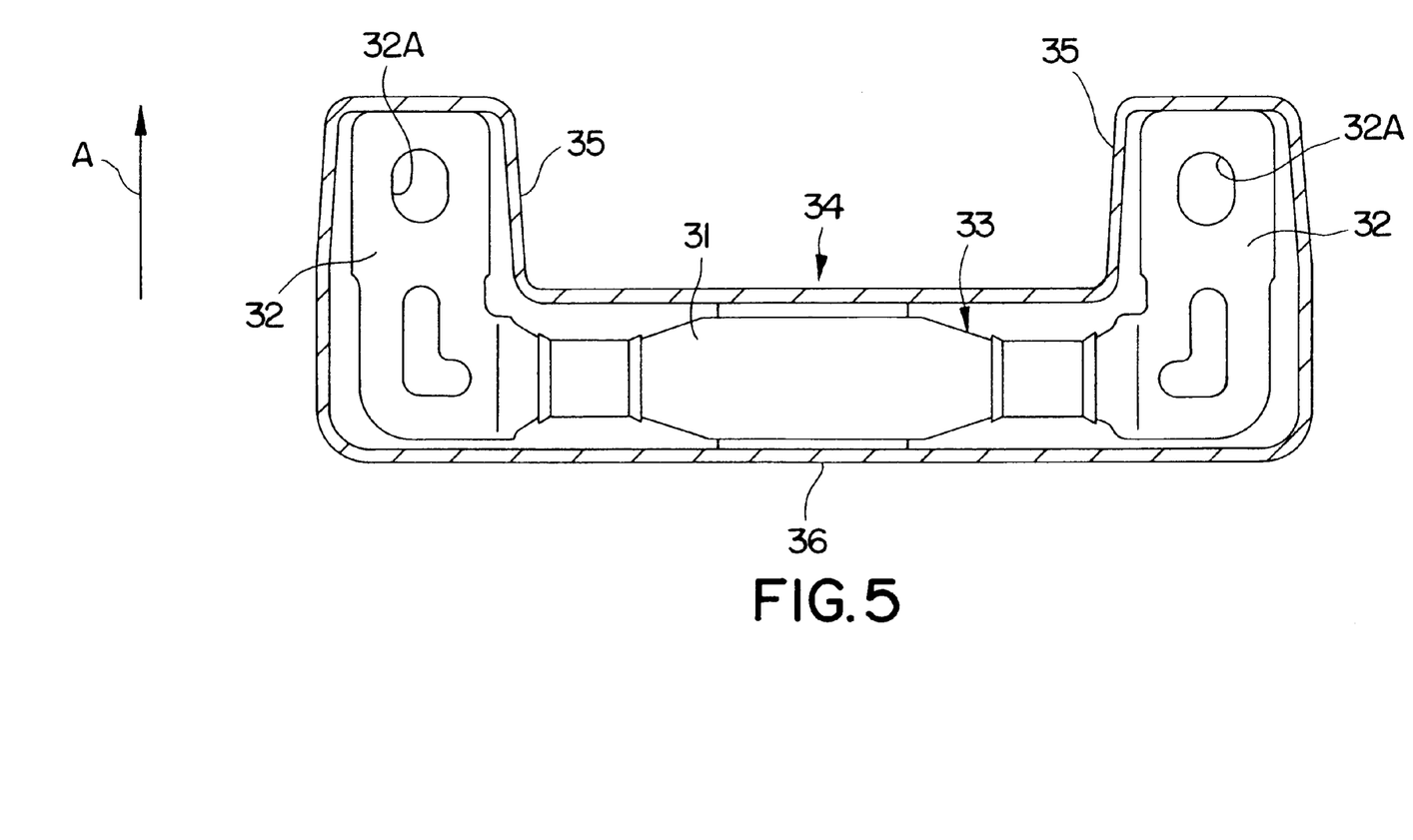
FIG. 5 is a horizontal section of a battery connection terminal and a cover according to a third embodiment.

In a third embodiment, L-shaped terminal portions 32 are fixedly connected with the opposite ends of a braided wire 31 as shown in FIG. 5. Accordingly, when a battery connection terminal 33 is viewed entirely from above, its opposite ends are projecting in a direction A, e.g. forwardly. At a projection end of each terminal portion 32 is formed an insertion hole 32A through or into which the battery post 2 (see FIG. 1) is insertable.

In conformity with the battery connection terminal 33, the cover 34 is configured such that its opposite ends are bent to project in the same or similar direction as the direction A of the battery connection terminal 33, e.g. forwardly. The bent opposite ends form post cover portions 35 for covering the battery posts 2 through openings in their lower surfaces. Similar to the first embodiment, a bottomed middle portion of the cover 34 forms a tubular portion 36 through which the battery connection terminal 33 is to be passed.

Accordingly, similar to the first embodiment, the cover 34 can be elongated and contracted according to a distance between the battery posts 2 in the third embodiment. Thus, the third embodiment also has effects such as an easy mounting of the cover 34 regardless of a distance variation between the battery posts 2. Further, since the opposite ends of the cover 34 and the battery connection terminal 1 are bent in this embodiment, even if there is an obstacle between the battery posts 2, they can be connected while avoiding the obstacle.

Figure 6:
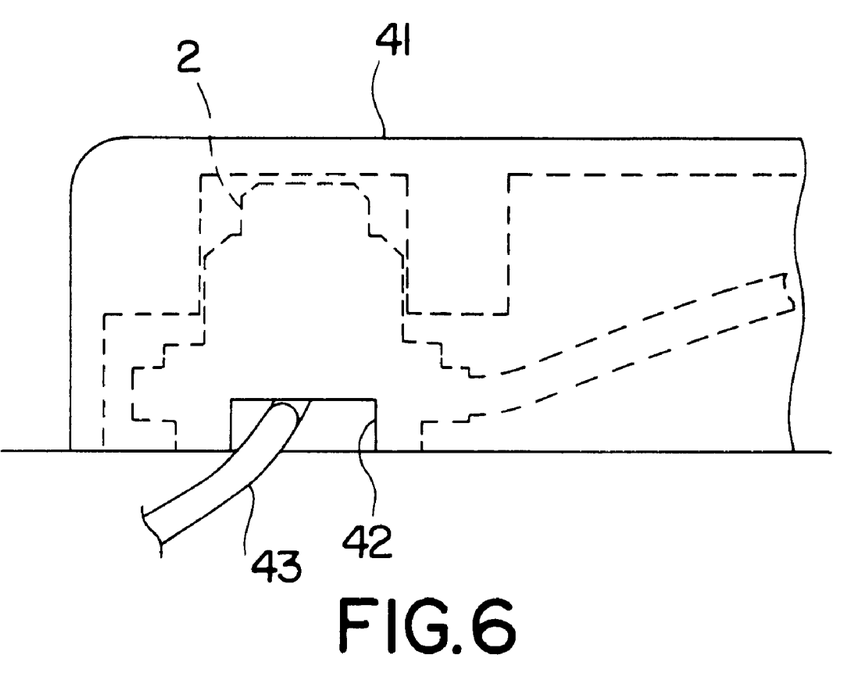
FIG. 6 is a side view of a fourth embodiment.

As shown in FIG. 6, a portion of a lower edge portion of a post cover portion 41 may be cut away to form a wire withdrawal opening 42, so that, for example, a lead wire 43 for a sensor connected with the battery post 2 is withdrawn through the wire withdrawal opening 42.

Hereafter, a fifth embodiment of a cover for a battery post according to the invention is described with reference to FIGS. 7 to 9.

Figure 7:
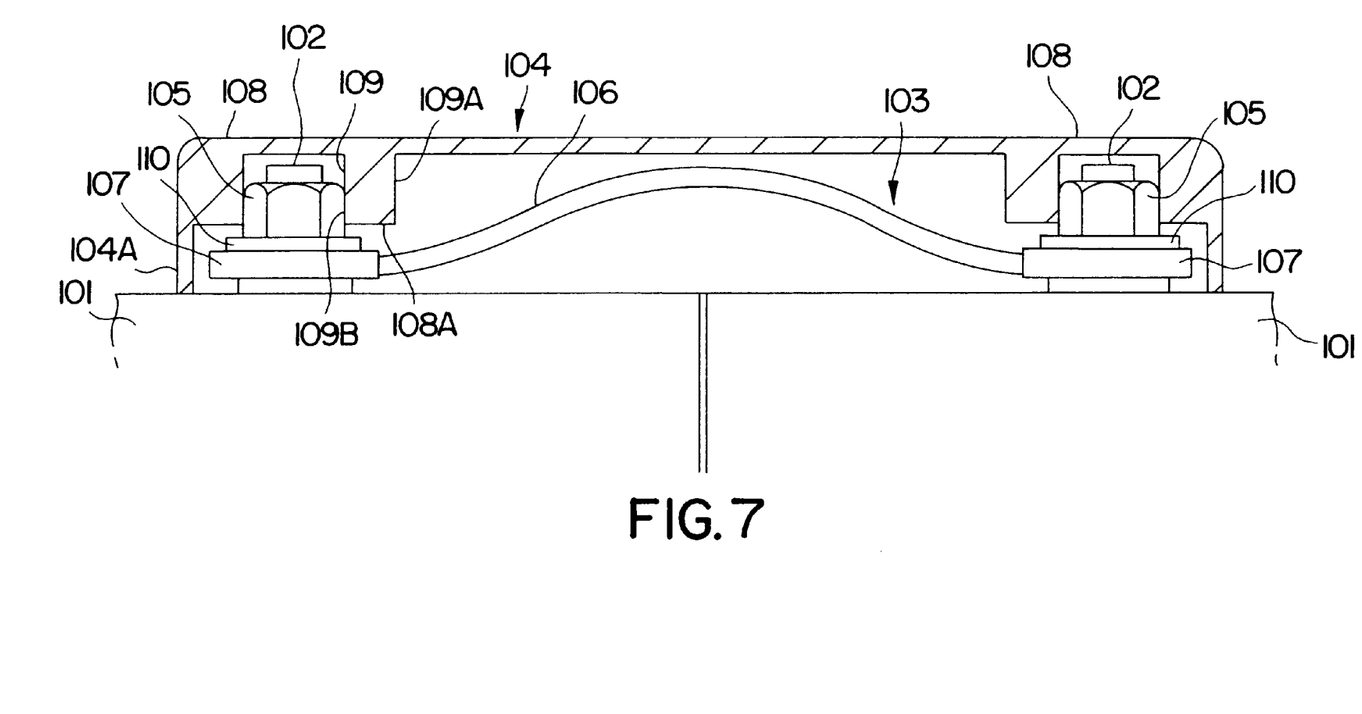
FIG. 7 is a section entirely showing a fifth embodiment.

In this embodiment, as shown in FIG. 7, batteries 101 are juxtaposed, and a battery connection terminal 103 is provided between battery posts 102 of the respective batteries 101 to connect them. A cover 104 according to the invention is so constructed to at least partially substantially cover the battery posts 102 together with the connection terminal 103. An external thread is formed on the outer surface of each battery post 102, so that a holding means, e.g. nut 105 can be fixed or secured or screwed thereto.

First, the battery connection terminal 103 for connecting the battery posts 102 is described. The battery connection terminal 101 is, as shown in FIG. 7, comprised of a braided wire 106 formed by braiding a multitude of fine wires into a substantially strip-like shape, and terminal portions 107 which are fixedly connected with the opposite ends of the braided wire 106 and formed with an insertion hole (not shown) through or into which the battery post 102 is insertable. The length of the braided wire 106 is so set as to slightly slacken with the respective terminal portions 107 fitted to the battery posts 102 of positioned batteries 101. This is to prevent the braided wire 106 from being strongly pulled when a distance between the battery posts 102 varies due to the displacement and/or vibration of the batteries 101.

Figure 8:
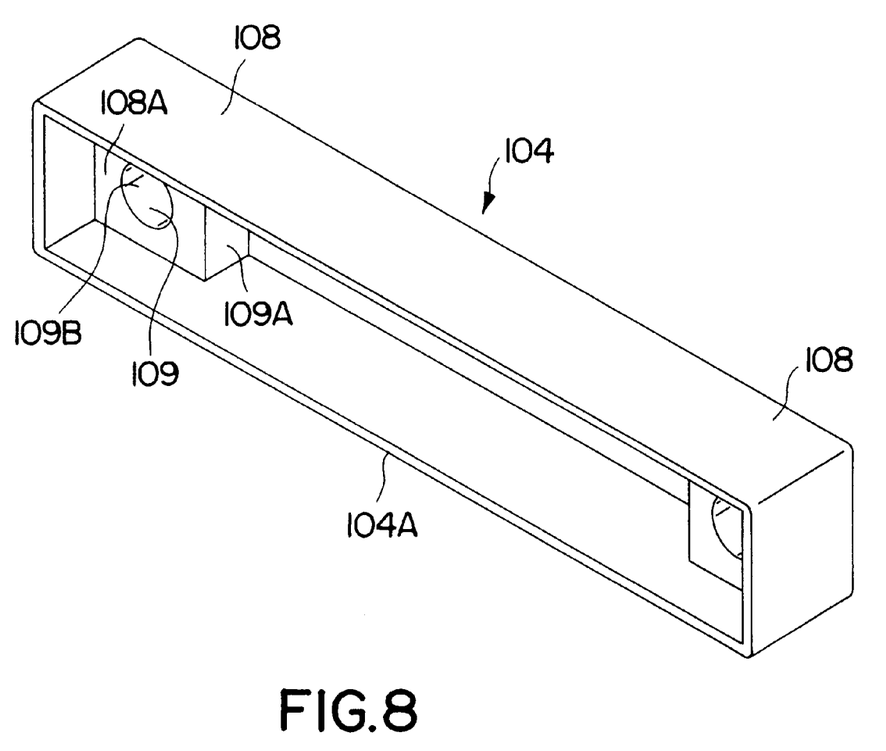
FIG. 8 is a perspective view of a cover according to the fifth embodiment.
Figure 9:
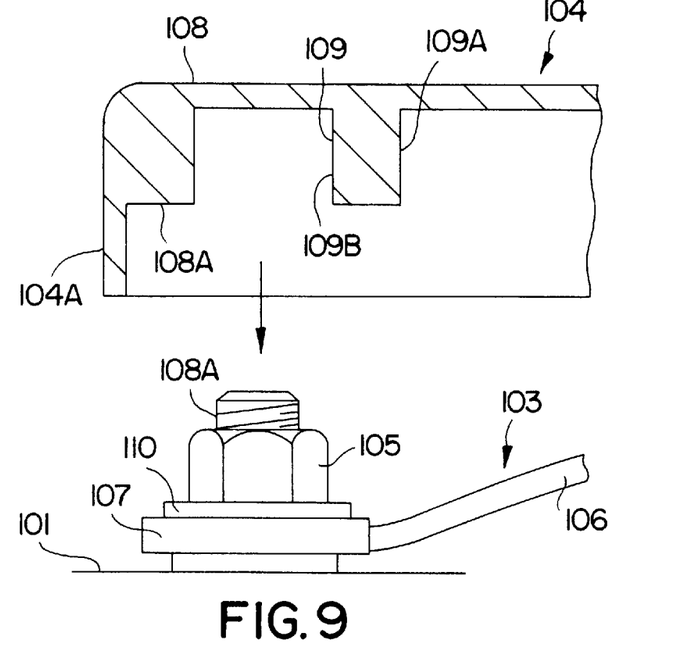
FIG. 9 is a section showing a post cover portion according to the fifth embodiment.

The cover 104 is made of a rubber material and has a narrow box-like configuration having an open lower surface (front surface in FIG. 8) as shown in FIG. 8. The length of the cover 104 is so set as to accommodate the battery connection terminal 103 preferably in a slightly curved manner. The left and right side portions (the opposite side with respect to a longitudinal direction) of the cover 104 form post cover portions 108 for covering the battery posts 102. The terminal portions 107 of the battery connection terminal 103 are arranged in the post cover portions 108. It should be noted that the rubber or elastic or deformable or elongatable material corresponds to an example of a soft insulating material.

Portions of a ceiling portion (ceiling wall portion in FIG. 7) of the cover 104 corresponding to the post cover portions 108 are formed to have a substantially larger thickness than the other portions. In other words, the ceiling wall of the cover 104 is preferably thicker at the left and right side portions thereof. As shown in FIG. 9, a thick ceiling portion 108A of each post cover portion 108 is formed preferably substantially in its center with a press hole 109 (corresponding to a press hole of the invention) into which the battery post 102 is pressed or inserted or insertable. The size of the press hole 109 is sufficiently smaller than the area of the ceiling portion 108A and, accordingly, a peripheral portion 109A of the press hole 109 is thicker than a side wall 104A of the cover 104. The inner diameter of the press hole 109 is set slightly smaller than the outer diameter of the nut 105 to be screwed to the battery post 102. Accordingly, the battery post 102 can be pressed into the press hole 109 with the nut 105 screwed thereto. The depth of the press hole 109 is preferably set such that the bottom edge of the cover 104 is substantially in contact with the upper surf ace of the battery 1 when the leading end of the battery post 102 is almost in contact with the ceiling surface of the press hole 109.

Next, an operation of mounting the cover 104 is described. First, the battery connection terminal 103 is mounted prior to the mounting of the cover 104. Specifically, the respective terminal portions 107 are fitted to the battery posts 102; washers 110 are preferably fitted to the battery posts 102; and the nuts 105 are screwed above the washers 110. In this way, the juxtaposed battery posts 102 are electrically connected.

After the mounting of the battery connection terminal 103 is completed, the cover 104 is mounted. Specifically, the cover 104 is brought to a position where the respective post cover portions 108 are positioned above the corresponding battery posts 102 (see FIG. 9), and the cover 104 is fitted substantially over the battery posts 102 and the battery connection terminal 103 through the opening in its lower surface. Then, the nuts 105 come into contact with insertion openings 109B of the press holes 109 when the leading ends of the battery posts 102 slightly enter the press holes 109. Thereafter, if the upper surfaces of the post cover portions 108 are strongly pressed, the battery posts 102 and the holding means, e.g. the nuts 105 are pressed into the corresponding press holes 109 while substantially widening the press holes 109. When the bottom edge of the cover 104 comes into contact with the upper surfaces of the batteries 101, the mounting of the cover 104 is completed (see FIG. 7).

As described above, in this embodiment, when the cover 104 is mounted on the battery posts 102 and the battery connection terminal 103, the battery posts 102 are pressed into the press holes 109 together with the nuts 105, making it difficult for the cover 104 to be detached. Accordingly, the detachment of the cover due to an inadvertent external force can be prevented. Further, since the peripheral portions 109A of the press holes 109 are thick, an occurrence of an undesirable event where the insertion of the battery posts 102 into the press holes 109 becomes difficult due to the deformation of the press holes 109 can be prevented. Furthermore, since the two juxtaposed battery posts 102 can be covered by one cover 104 at one time, work efficiency can be improved.

Although the cover 104 is so constructed as to cover the battery posts 102 and the battery connection terminal 103 in the fifth embodiment, a cover according to a sixth embodiment is so constructed as to cover one battery post.

Figure 10:
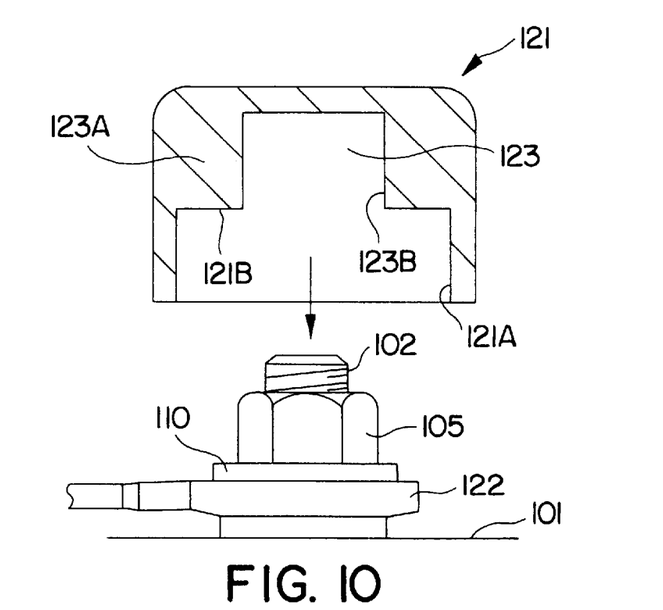
FIG. 10 is a section of a sixth embodiment.

As shown in FIG. 10, a cover 121 has a substantially box-like configuration having an open lower surface. The size of an opening 121A is set such that a terminal fitting 122 connected with an end of a wire and fitted to a battery post 102 can be accommodated in the cover 121.

A ceiling portion 121B of the cover 121 is formed to have a large thickness and, similar to the fifth embodiment, is formed substantially in its center with a press hole 123 into which the battery post 102 is or can be pressed or inserted together with a nut 105. Similar to the fifth embodiment, the inner diameter of the press hole 123 is or may be set slightly smaller than the outer diameter of the nut 105 to be screwed to the battery post 102; the depth thereof is set such that the bottom edge of the cover 121 is substantially in contact with the upper surface of a battery 1 when the leading end of the battery post 102 is almost in contact with the ceiling surface of the press hole 123; and a peripheral portion 123A of the press hole 123 is thicker than a lower end portion of the cover 121.

Prior to the mounting of the cover 121, the terminal fitting 122 connected with the end of the wire is fitted to the battery post 102 and fastened or secured thereto by the nut 105 and the washer 10. Thereafter, the cover 121 is fitted over the battery post 102 from above through the opening 121A in its lower surface. Then, similar to the fifth embodiment, the nut 105 comes into contact with an insertion opening 123B when the leading end of the battery post 102 slightly enter the press hole 123. Accordingly, if the upper surface of the cover 121 is strongly pressed in this state, the battery post 102 is pressed into the press hole 123 together with the nut 105. When the bottom edge of the cover 121 comes into contact with the upper surface of the battery 1, the mounting of the cover 121 is completed.

As described above, in this embodiment as well, the battery post 102 is pressed into the press hole 123 together with the nut 105, making it difficult for the cover 121 to be detached. Further, since the peripheral portion 123A of the press hole 123 is thick, an occurrence of an undesirable event where the insertion of the battery post 102 into the press hole 109 becomes difficult due to the deformation of the press hole 109 can be prevented.

Figure 11:
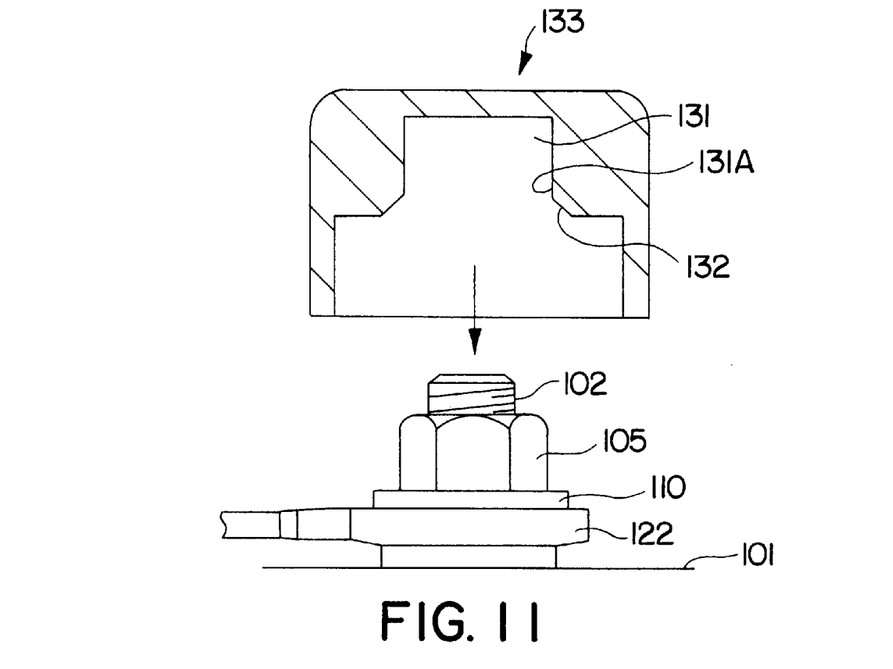
FIG. 11 is a section of a seventh embodiment.

In a seventh embodiment, an opening edge of an insertion opening 131A of a press hole 131 is obliquely cut away to form a tapered surface 132 as shown in FIG. 11. Since the other construction is similar to that of the sixth embodiment, no description is given thereon by identifying the same elements by the same reference numerals.

With this tapered surface 132, even if a battery post 102 is slightly displaced with respect to the press hole 131 when being pressed into the press hole 131 together with a nut 105, the leading end of the battery post 102 or the upper end of the nut 105 comes into contact with the tapered surface 132, thereby smoothly guiding the battery post 102 and the nut 105 into the press hole 131. Accordingly, the cover 133 can be more easily mounted.

The present invention is not limited to the foregoing embodiments. For example, the invention can be embodied in the following manners. Such embodiments are also embraced by the technical scope of the present invention as defined in the claims.

Although the covers 6, 34 are made of a rubber material in the foregoing embodiments, they may be made of a soft resin material such as polyvinyl chloride or other substantially elastic or deformable material, which can be e.g. elongated and/or contracted or otherwise change its shape.

Although the slits 9 are formed in the side walls between the post cover portions 8, 21 and the tubular portion 7 to allow the post cover portions 8, 21 to be bent in an opening direction, e.g. upwardly in the first and second embodiments, the side walls may be so formed as to continuously extend from the tubular portion to the post cover portions without forming the slits.

Although the covers 6, 34 are provided with the tubular portions 107, 36 through which the battery connection terminals 1, 33 are to be passed in the foregoing embodiments, instead of forming the tubular portion, the entire lower surface of the cover may be made open.

In the first embodiment, a tapered surface may be formed at the opening edge of the press hole 10 to facilitate the insertion of the battery posts 2 and the nuts 11.

Although the cover 104 is provided at its opposite ends with the post cover portions 108 to cover two juxtaposed battery posts 102 in the first embodiment, the cover may be provided with three or more post cover portions arranged at specified intervals to cover three or more battery posts at one time.

Although the battery post 102 is pressed in to the press hole 109, 123 or 131 together with the nut 105 in the first embodiment, only a leading end of the battery post projecting upward from the screwed nut may be pressed into the press hole.

Figure 12:
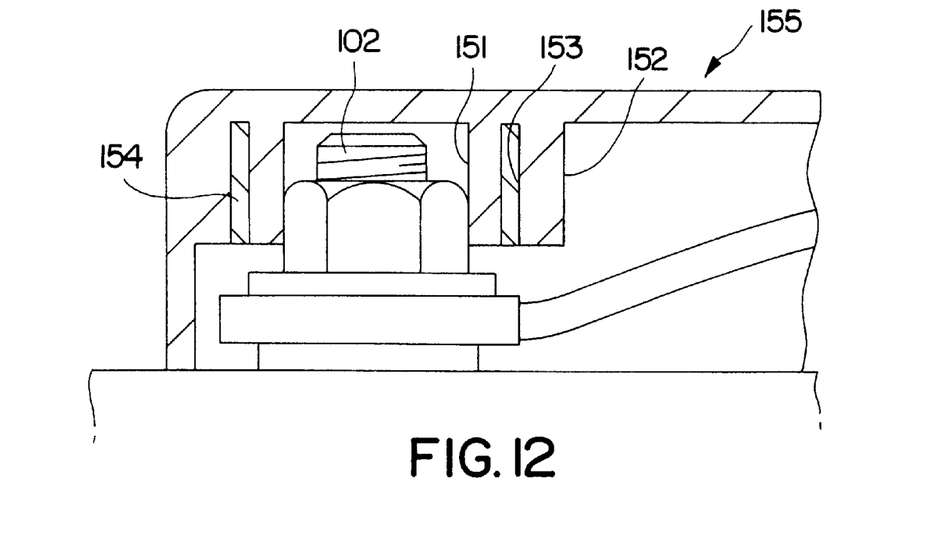
FIG. 12 is a section of an eighth embodiment (provided with a collar).

As shown in FIG. 12, a notch is formed in a peripheral portion 152 of a press hole 151 concentrically with the press hole 151, and a resin collar 154 is fitted into this notch. This makes it difficult for a cover 155 to be detached and for the peripheral portion 152 of the press hole 151 to buckle. Therefore, the battery post 102 can be advantageously smoothly inserted. Further, instead of fitting the collar into the notch, the collar may be integrally formed with the cover.

Various other changes can be made without departing from the spirit and scope of the present invention as defined in the claims.

What is claimed is:

1. A battery connection cover for at least partially covering a battery connection terminal, said terminal comprising an elongate conductive portion having opposed first and second ends and first and second terminal portions provided on the respective first and second ends of the conductive portion and being for connection with first and second battery posts, said cover comprising:

a cover main body having opposed first and second ends, a top wall and a pair of opposed side walls depending from said top wall, said cover main body being dimensioned for substantially covering at least part of the conductive portion, and first and second post cover portions, said first and second post cover portions each having a top wall unitarily formed with the cover main body at the respective first and second ends of the cover main body, said first and second post cover portions further having opposed side walls extending downwardly from said top wall, an end wall extending downwardly from said top wall and between said side walls and an open bottom, each said post cover portion being formed to define a press hole extending upwardly toward the top wall of the respective post cover portion at a location spaced inwardly from the side walls and end wall thereof, each said press hole being dimensioned for receiving one said battery post therein, each said post cover portion including a peripheral portion surrounding the respective press hole, the peripheral portions being thicker than other portions of said battery connection cover, said first and second post cover portions being dimensioned for substantially covering at least part of one of the terminal portions, slits being formed in said cover for partially separating the side walls of the first and second post cover portions from the side walls of the cover main body for enabling the post cover portions to be rotated about said top wall of said cover main body for selectively exposing said battery posts and said terminal portions, each said peripheral portion surrounding each said press hole being provided with a collar having an increased stiffness with respect to each said peripheral portion which is arrangeable over each said battery post, the collar being a resin collar, and the cover main body and the post cover portions adjacent the resin collar being unitarily made of a soft insulating material.

2. A battery connection cover for at least partially covering a battery connection terminal, said terminal comprising a conductive portion and at least one terminal portion provided on the conductive portion and being for connection with at least one battery post, said cover comprising:

a cover main body formed from a soft insulating material and dimensioned for substantially covering at least part of the conductive portion;

at least one post cover portion integrally formed with the cover main body from the soft insulating material and dimensioned for substantially covering at least part of the terminal portion, said post cover portion further comprising at least one press hole into which the battery post can be at least partially pressed, and a thick peripheral portion surrounding the press hole; and the thick peripheral portion surrounding the press hole being provided with a resin collar having an increased stiffness with respect to the peripheral portion which is arrangeable over the battery post.

3. A battery connection cover for at least partially covering a battery connection terminal, said terminal comprising an elongate conductive portion having opposed first and second ends, first and second terminal portions provided on the respective first and second ends of the conductive portion and being configured for connection respectfully with first and second battery posts, said cover being unitarily formed from a deformable material and comprising:

an elongate top wall dimensioned to overlie said battery connection terminal, said top wall having opposed first and second ends and opposed left and right sides, first and second end walls extending downwardly a selected distance from the respective first and second ends of the top wall, left and right side walls extending downwardly the selected distance from said left and right sides of said top wall, first and second spaced apart post cover portions extending unitarily downwardly from said top wall at locations between said side walls, said first post cover portion being in proximity to said first end wall and said second post cover portion being in proximity to said second end wall, said first and second post cover portions each including a press hole extending upwardly therein toward said top wall, said press holes being dimensioned to engage over the respective first and second battery posts and to substantially overlie said first and second terminal portions of said battery connection terminal, said battery connection cover having a first pair of slits comprising a first left slit and a first right slit formed respectively in the left and right side walls at locations between said post cover portions and closer to said first cover portion than to said second cover portion, said battery connection cover further having a second pair of slits comprising a second left slit and a second right slit formed respectively in said left and right side walls, said second pair of slits being disposed between said first pair of slits and said second post cover portion, each of said slits in said first and second pairs having open ends at edges of said first and second side walls furthest from said top wall and having closed ends closer to said top walls, said battery connection cover being bendable about first and second portions of said top wall registered respectively with the first and second pairs of slits for accessing said first and second battery posts and said first and second terminal portions respectively.

4. A battery connection cover according to claim 3, wherein an insertion portion of the peripheral portion surrounding each said press hole for the battery post is formed with a tapered surface for relatively guiding the battery post and the press hole.

5. A battery connector cover according to claim 3, wherein each said slit is widened or rounded at said closed end.

6. The battery connection cover according to claim 3, wherein the post cover portions have bottom ends, said top wall being closer to the closed ends of said slits than to the bottom ends of the post cover portions.

7. The battery connection cover of claim 6, wherein said post cover portions include peripheral regions surrounding the respective press holes, the peripheral regions of said post cover portions being thicker than all other portions of said battery connection cover.

8. The battery connection cover of claim 7, wherein the peripheral regions of said post cover portions are sufficiently thick such that said post cover portions are unitarily joined to the respective end walls and portions of the respective side walls in proximity to the end walls.

9. The battery connection cover of claim 8, further comprising a bottom wall disposed between said slits and extending substantially parallel to said top wall.

10. A battery connection cover according to claim 3, wherein the cover main body further includes a bottom wall extending between portions of the side walls remote from said top wall thereof, such that at least portions of the cover main body are of substantially rectangular tubular configuration.

* * * * *